US00RE48947E

(19) United States
(12) Reissued Patent
Shalev

(10) Patent Number: US RE48,947 E
(45) Date of Reissued Patent: Mar. 1, 2022

(54) TODDLER SPOON

(71) Applicant: ELLI & NOOLI, LLC, Los Angeles, CA (US)

(72) Inventor: Maya Shalev, Los Angeles, CA (US)

(73) Assignee: Pike Brands LLC, Seattle, WA (US)

(21) Appl. No.: 29/703,974

(22) Filed: Aug. 30, 2019

Related U.S. Patent Documents

Reissue of:
(64) Patent No.: Des. 799,280
Issued: Oct. 10, 2017
Appl. No.: 29/558,958
Filed: Mar. 23, 2016

(51) LOC (13) Cl. ..... 07-03
(52) U.S. Cl.
USPC ..... D7/653
(58) Field of Classification Search
USPC ..... D7/395, 653–664; D8/107, 300
(Continued)

(56) References Cited

U.S. PATENT DOCUMENTS 2,338,980 A * 1/1944 Stratton ..... A47G 21/04 30/324
D148,693 S * 2/1948 Grosvenor ..... D7/644
(Continued)

*Primary Examiner* — Philip S Hyder
(74) *Attorney, Agent, or Firm* — K&L Gates LLP

(57) CLAIM

The ornamental design for a toddler spoon, as shown and described herein.

DESCRIPTION

*Notice: More than one reissue application has been filed for the reissue of U.S. Pat. No. D. 799,280. U.S. application Ser. No. 29/733,763, filed May 6, 2020 and U.S. application Ser. No. 29/733,760, filed May 6, 2020 were filed as divisional reissue applications from reissue U.S. application Ser. No. 29/703,974.*

FIG. 4 illustrates a front elevational view of the toddler spoon of FIG. 1[.]*;*

FIG. 5 illustrates a perspective view of the top-side of the toddler spoon of FIG. 1; and[.]

FIG. 6 illustrates a perspective view of the bottom-side of the toddler spoon of FIG. 1.

*FIG. 7 illustrates a side view of the toddler spoon according to a second embodiment, the opposite side view being a mirror image thereof;*

*FIG. 8 illustrates a top plan view of the toddler spoon of FIG. 7;*

*FIG. 9 illustrates a bottom plan view of the toddler spoon of FIG 7;*

*FIG. 10 illustrates a front elevational view of the toddler spoon of FIG. 7;*

*FIG. 11 illustrates a perspective view of the top-side of the toddler spoon of FIG. 7; and,*

*FIG. 12 illustrates a perspective view of the bottom-side of the toddler spoon of FIG. 7.*

Figure 1:
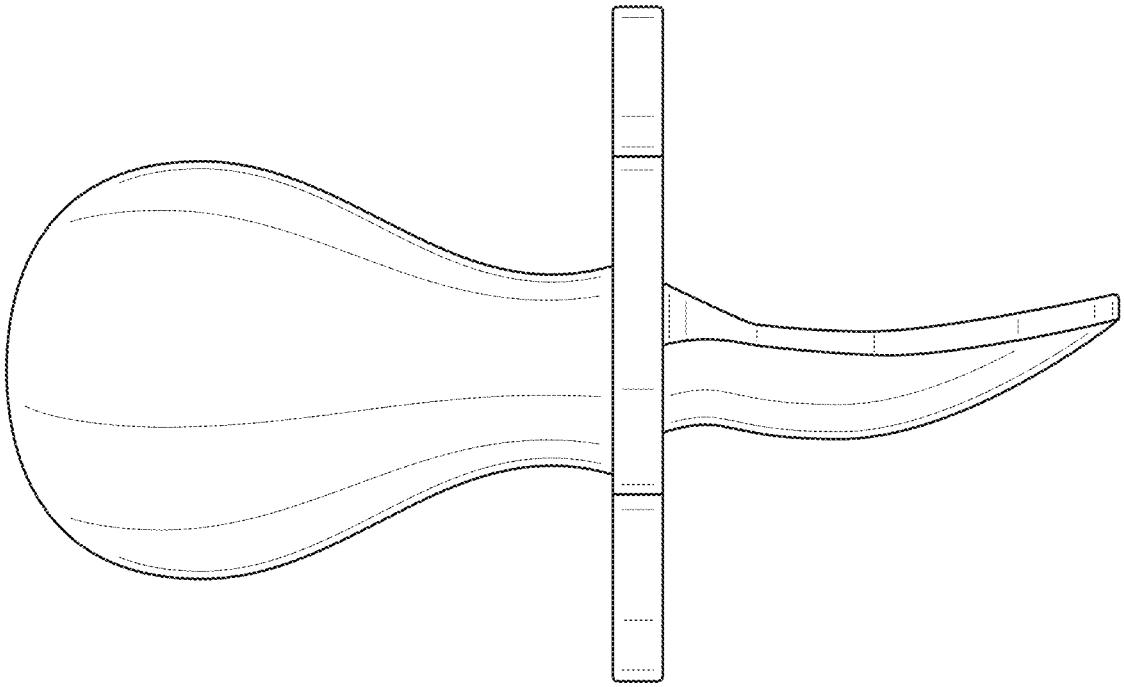
FIG. 1 illustrates a side view of a toddler spoon showing my new design *according to a first embodiment*, the opposite side view being a mirror image thereof[.]*;*
Figure 2:
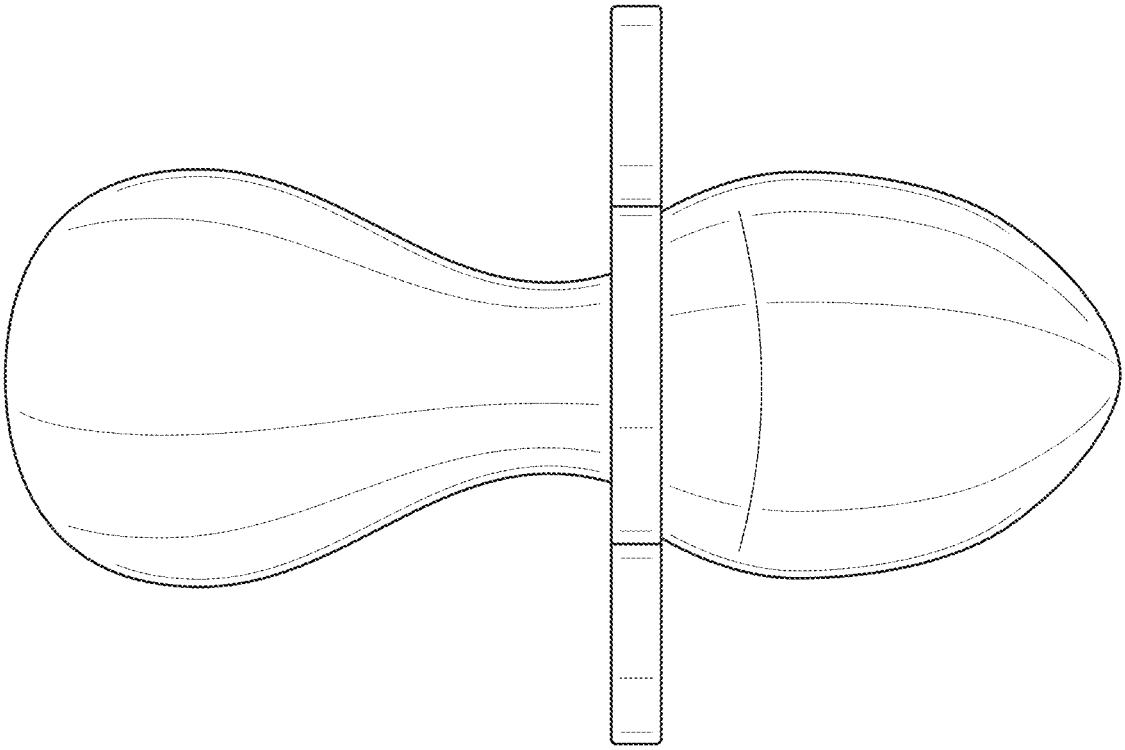
FIG. 2 illustrates a top plan view of the toddler spoon of FIG. 1[.]*;*
Figure 3:
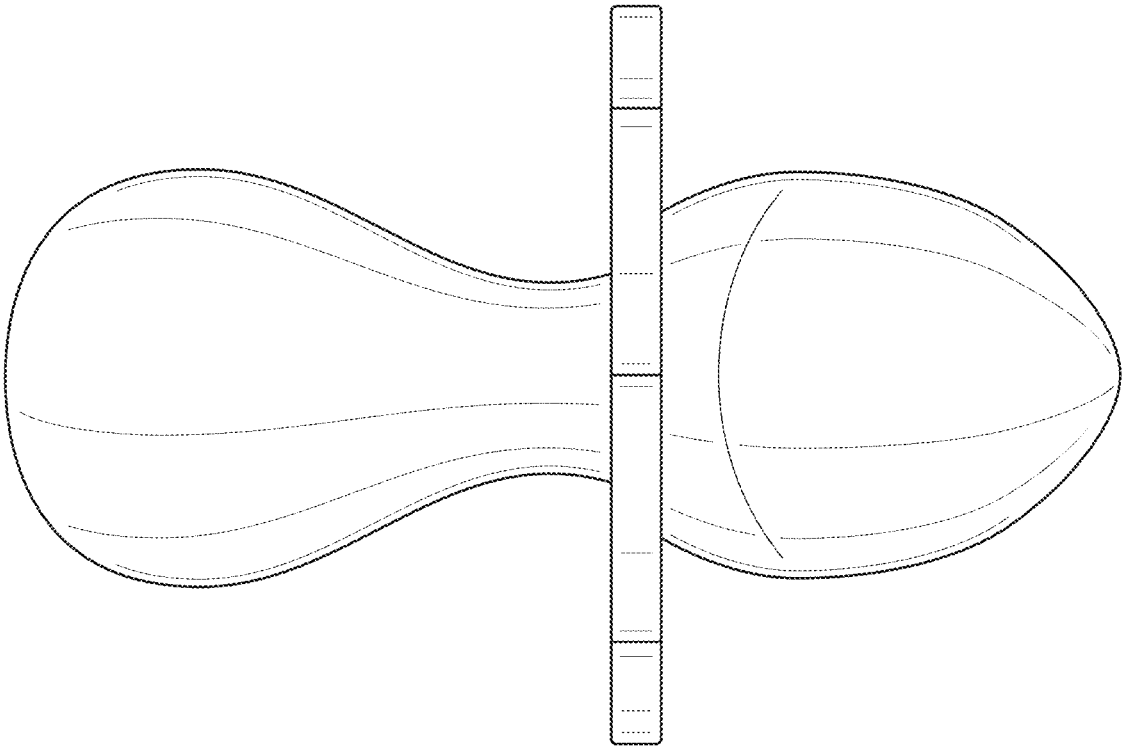
FIG. 3 illustrates a bottom plan view of the toddler spoon of FIG. 1[.]*;*

Any broken lines in the drawings are for illustrative purposes only and form no part of the claimed design. Additionally, the toddler spoon is not limited to the scale shown herein.

1 Claim, 12 Drawing Sheets

Matter enclosed in heavy brackets [ ] appears in the original patent but forms no part of this reissue; matter printed in italics indicates the additions made by reissue.

AMENDED

NEW

(58) Field of Classification Search
CPC ... A47G 21/04; A47G 21/0445; A61J 7/0023; B25G 3/00; B65D 75/56; B65D 75/563
See application file for complete search history.

(56) References Cited

U.S. PATENT DOCUMENTS

| | | | | | |
|---|---|---|---|---|---|
| D336,520 | S | * | 6/1993 | McDaniel | D24/194 |
| D339,036 | S | * | 9/1993 | McDaniel | D7/643 |
| D339,063 | S | | 9/1993 | Simon | |
| D349,770 | S | * | 8/1994 | Jarnagin | D24/198 |
| D413,049 | S | * | 8/1999 | Bergkvist | D7/653 |
| D419,397 | S | | 1/2000 | Liu | |
| 6,134,790 | A | * | 10/2000 | Watson | A47G 21/02 30/295 |
| D476,863 | S | * | 7/2003 | Jagger | D7/663 |
| D482,248 | S | * | 11/2003 | Roehrig | D7/663 |
| D491,420 | S | * | 6/2004 | Shibata | D7/653 |
| D496,833 | S | * | 10/2004 | Lantz | D7/653 |
| D582,046 | S | * | 12/2008 | Rohrig | D24/194 |
| D592,019 | S | * | 5/2009 | Holcomb | D7/643 |
| D614,922 | S | * | 5/2010 | Sierra | D7/653 |
| D615,367 | S | | 5/2010 | Sierra | |
| D621,229 | S | | 8/2010 | De Bretton | |
| D629,250 | S | * | 12/2010 | Finell | D7/401.2 |
| D657,621 | S | | 4/2012 | Pookrum | |
| D658,017 | S | * | 4/2012 | Roberts | D7/401.2 |
| D682,613 | S | * | 5/2013 | De Leo | D7/401.2 |
| D695,361 | S | * | 12/2013 | Roehrig | D21/525 |
| D707,307 | S | * | 6/2014 | Roehrig | D21/525 |
| D789,160 | S | | 6/2017 | Strandberg | |
| D834,381 | S | | 11/2018 | Appelbaum | |
| D834,382 | S | | 11/2018 | Appelbaum | |
| D850,197 | S | | 6/2019 | Thrailkill | |

* cited by examiner

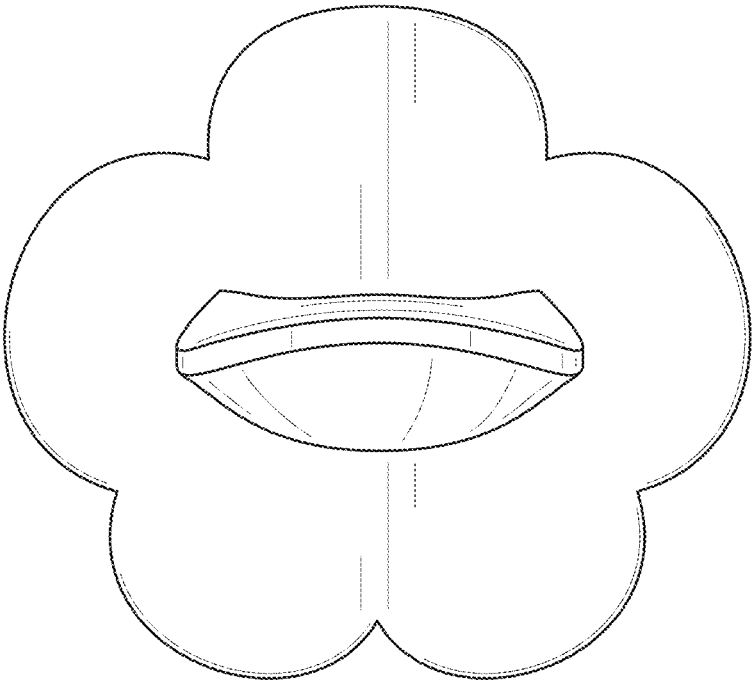
FIG. 4 AMENDED

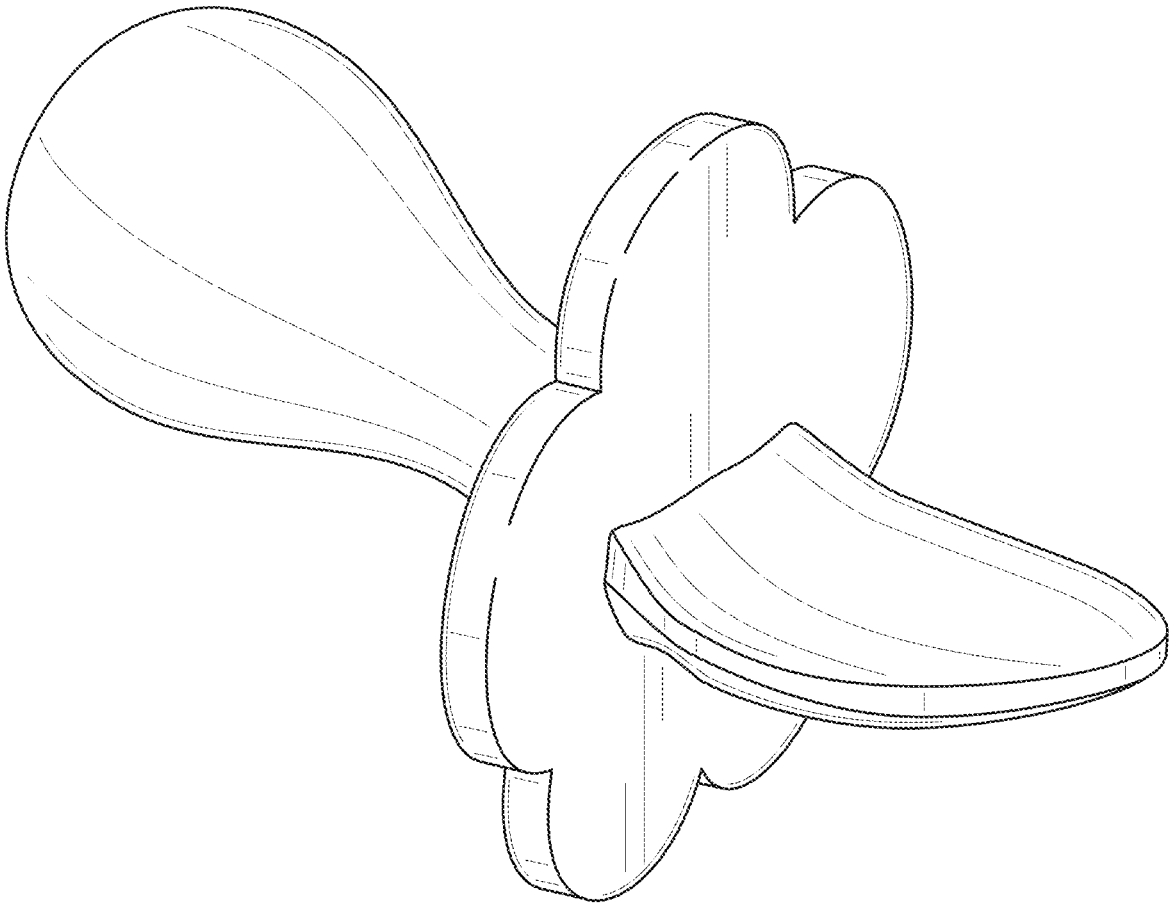
FIG. 5 AMENDED

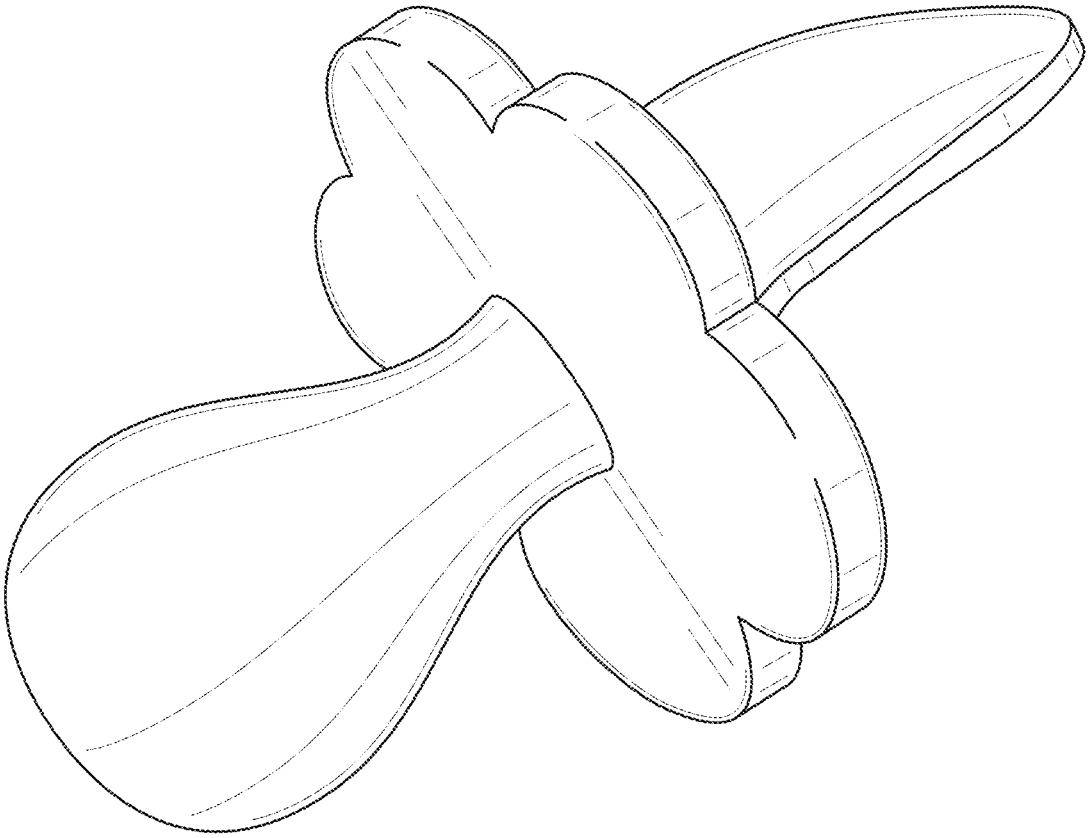
FIG. 6 AMENDED

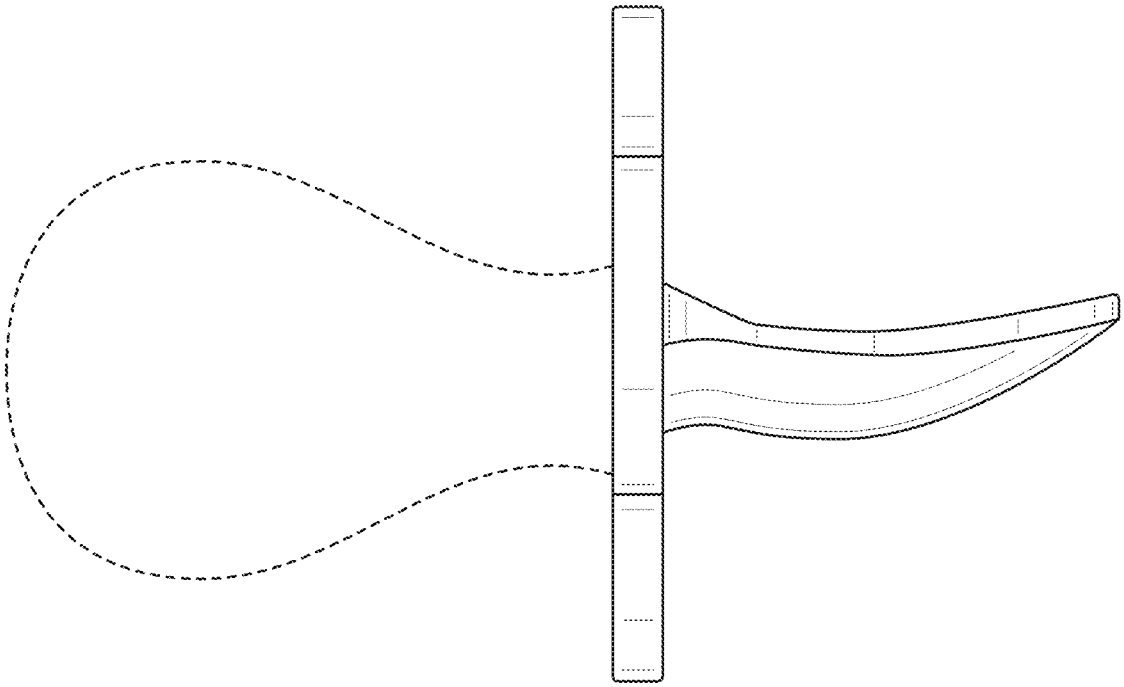
FIG. 7 NEW

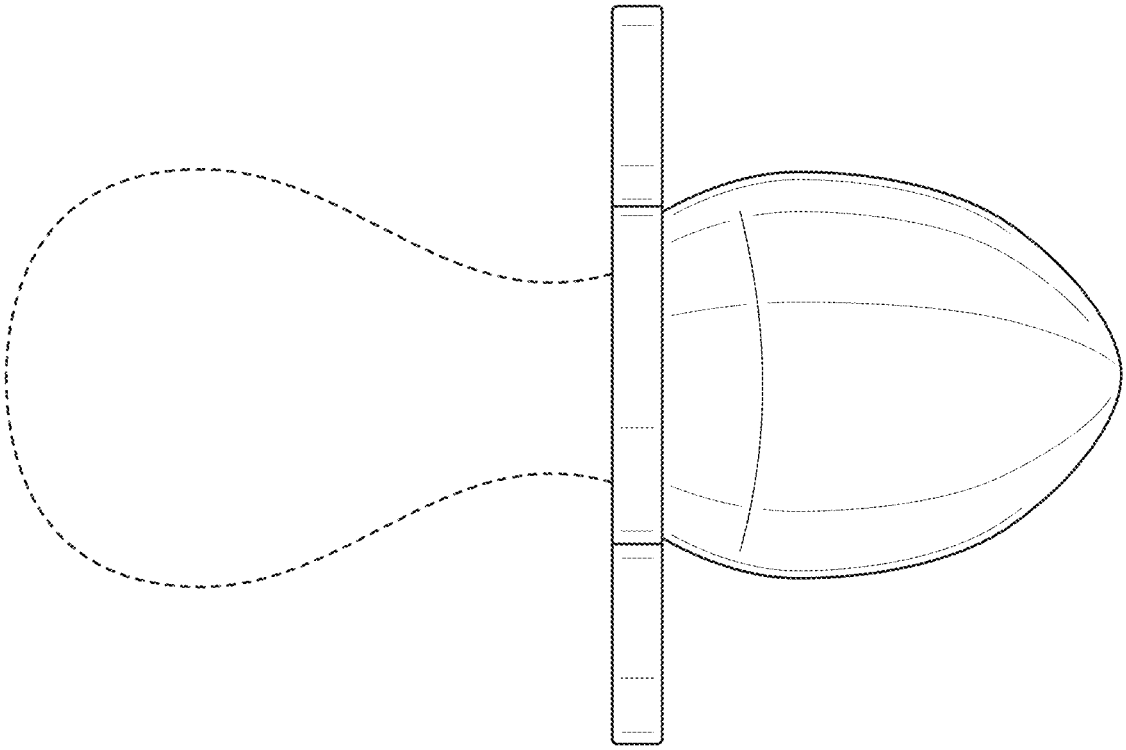
FIG. 8 NEW

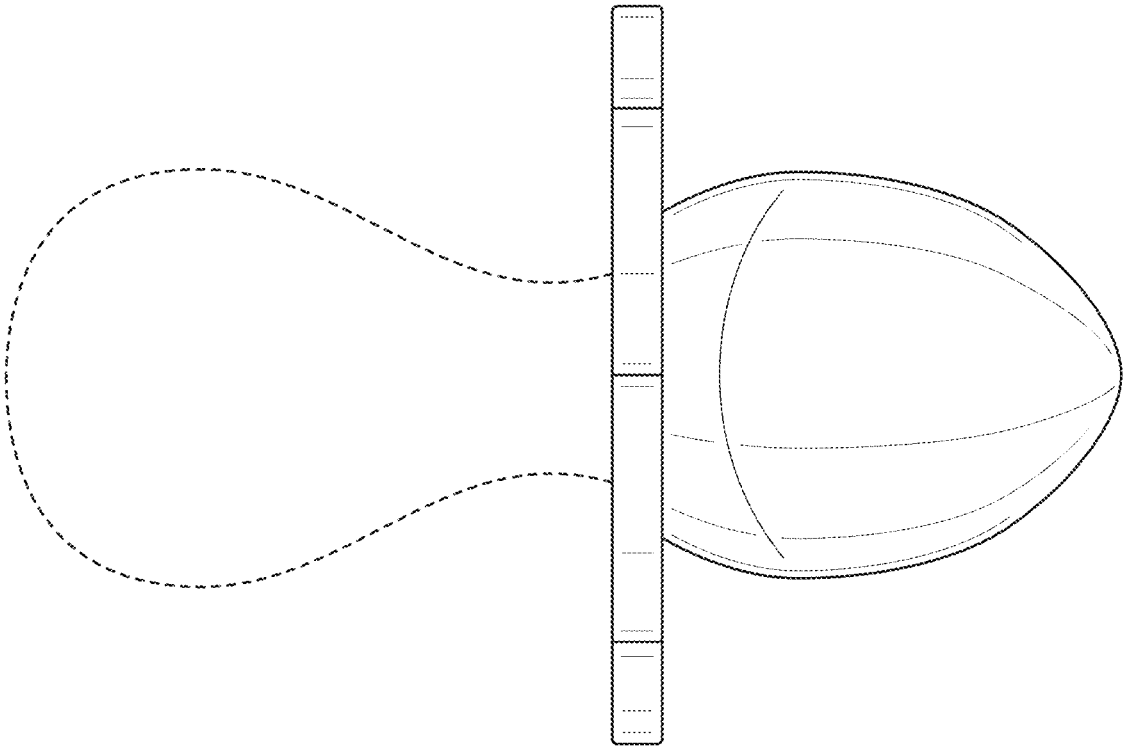
FIG. 9 NEW

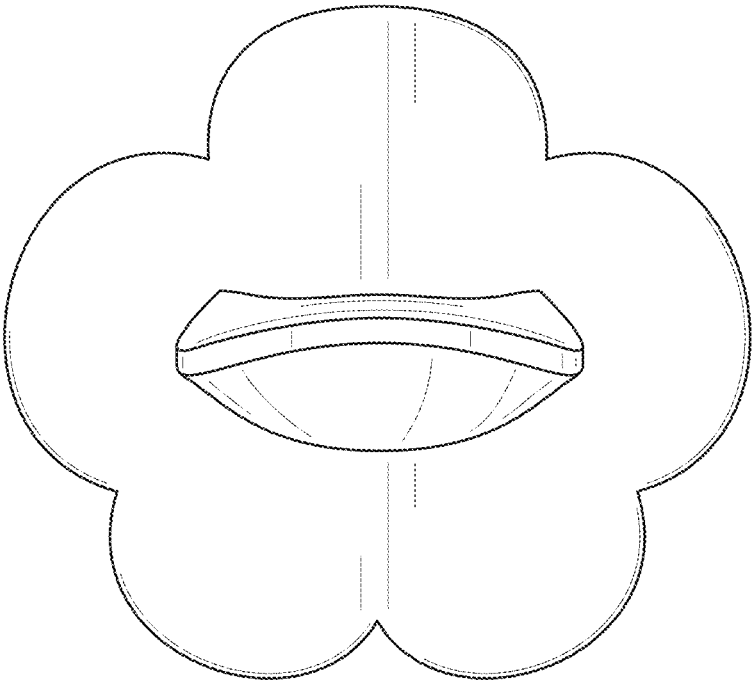
FIG. 10 NEW

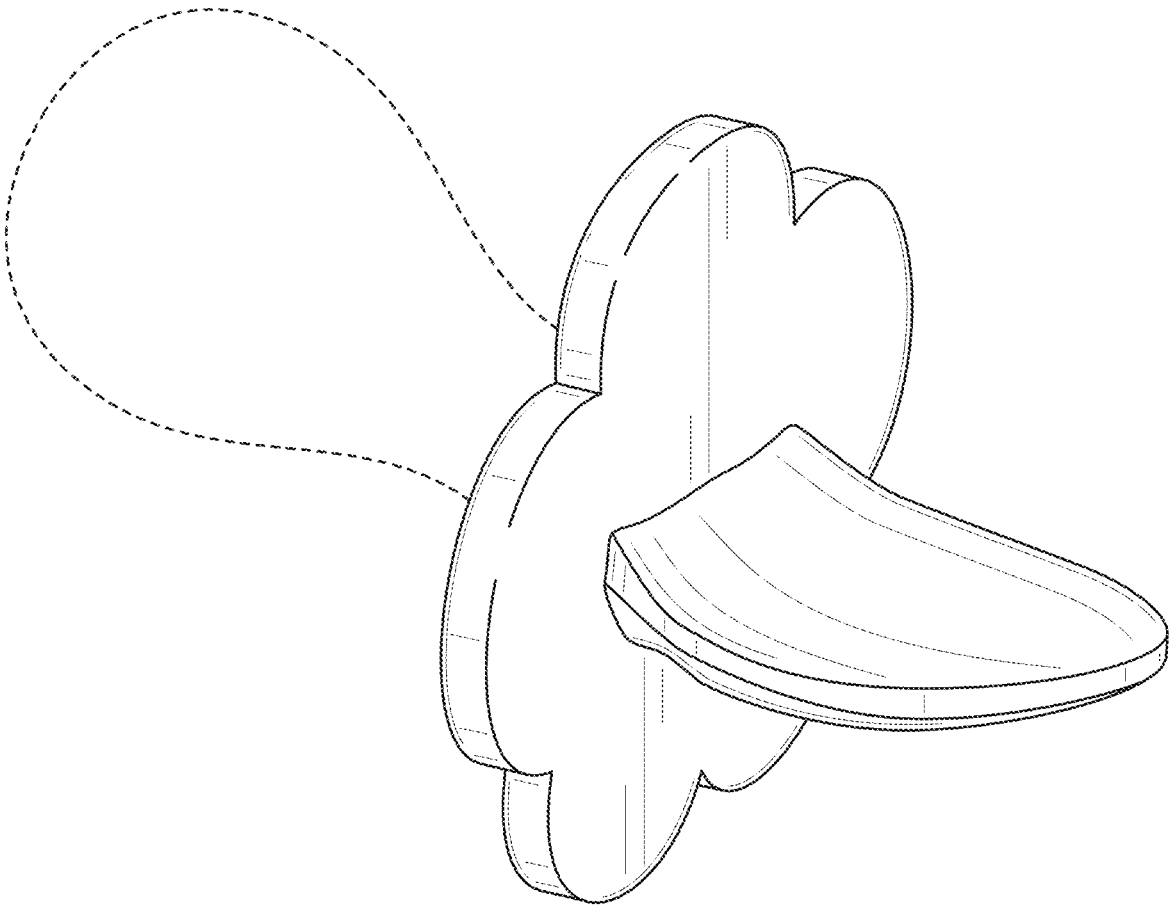
FIG. 11 NEW

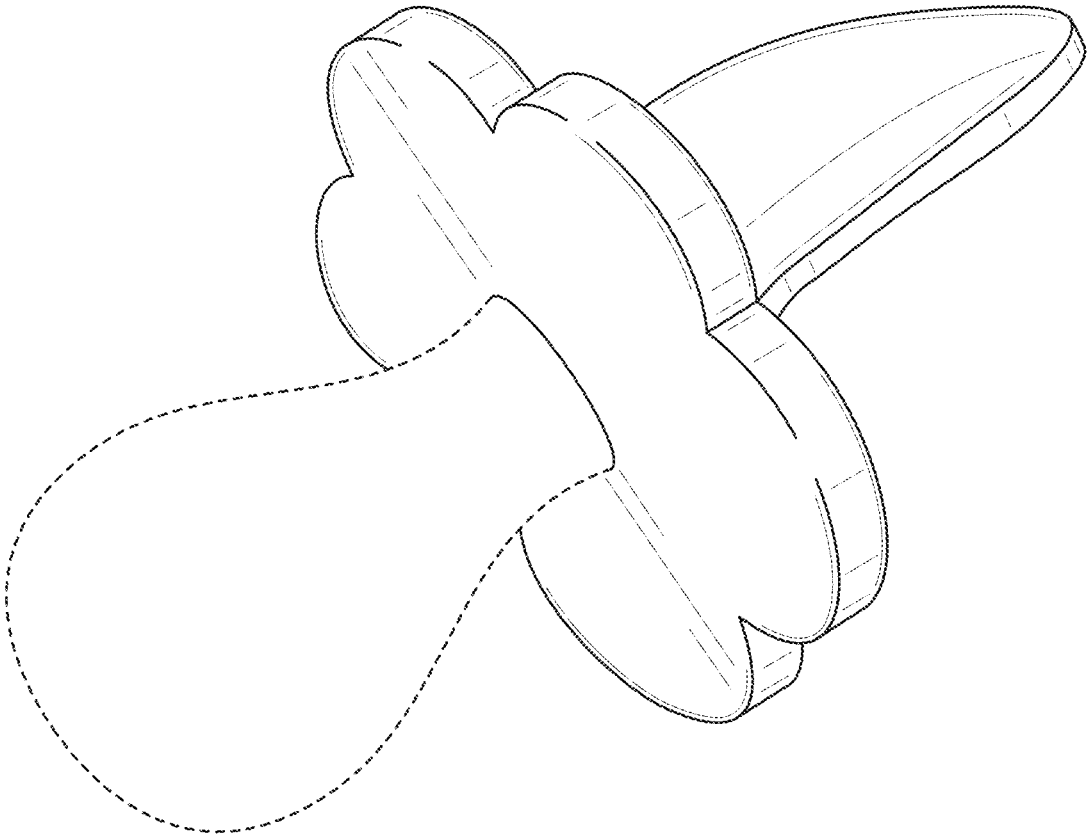
FIG. 12 NEW